Patented Oct. 22, 1929

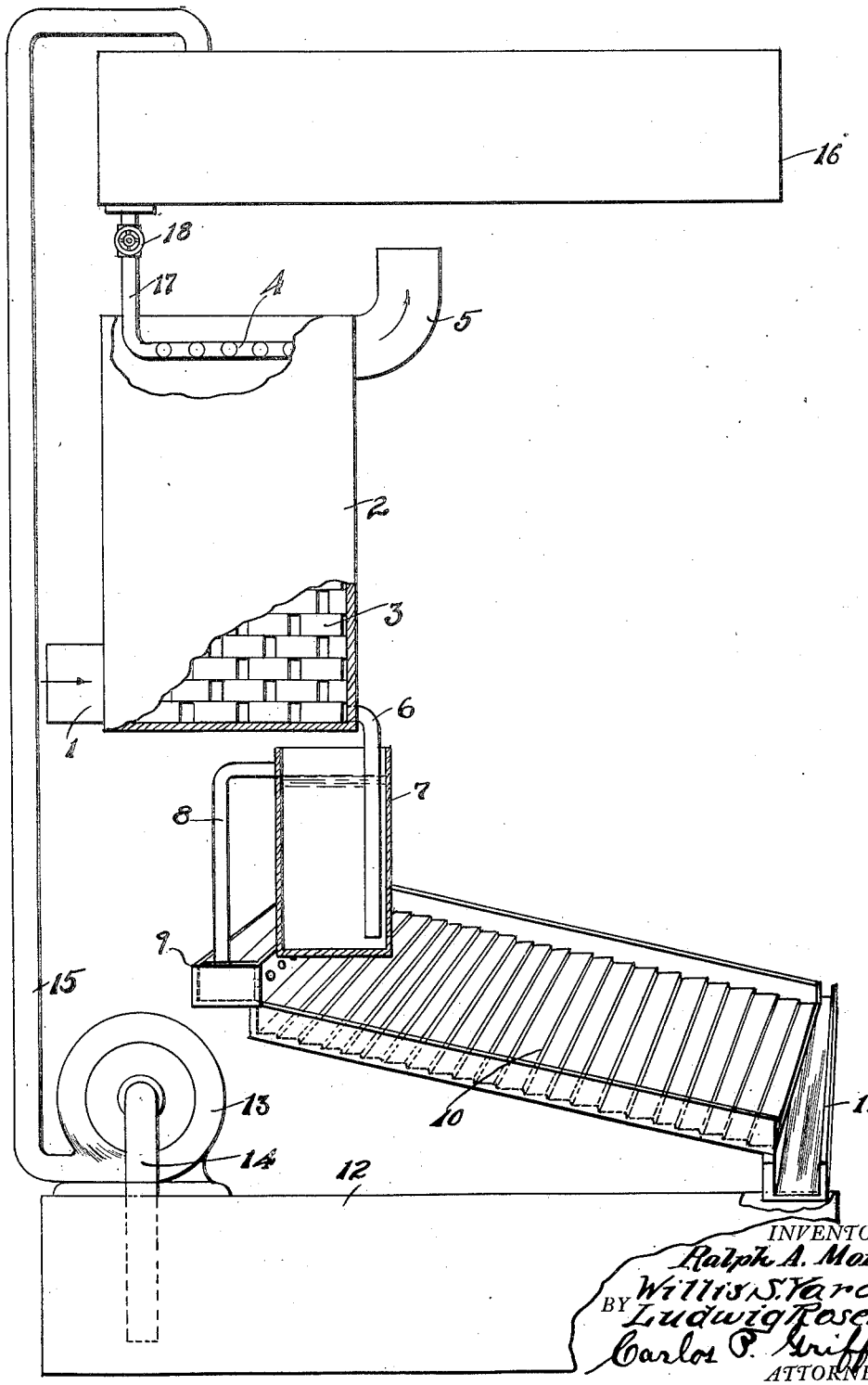

1,732,905

UNITED STATES PATENT OFFICE

RALPH A. MORGEN, OF OAKLAND, AND WILLIS S. YARD AND LUDWIG ROSENSTEIN, OF SAN FRANCISCO, CALIFORNIA, ASSIGNORS, BY MESNE ASSIGNMENTS, TO THE KOPPERS COMPANY, A CORPORATION OF PENNSYLVANIA

PROCESS FOR GAS PURIFICATION AND REGENERATING SULPHIDED ALKALINE SOLUTIONS

Application filed October 11, 1924. Serial No. 743,049.

This invention relates to a process for gas purification and the regeneration of an alkaline solution, commonly sodium carbonate, which has been used to scrub gas in order to remove hydrogen sulphide and other impurities from it.

A process at present in use consists in scrubbing the gas with an alkaline solution and then blowing a large volume of air through the solution, this resulting in the blowing out of the hydrogen sulphide as such, the air acting as an inert gas; but this under certain circumstances may be undesirable because of the emission into the atmosphere surrounding the gas works of a considerable amount of hydrogen sulphide which, if not dissipated into the upper air currents, may become objectionable because of its offensive odor and discoloring effect.

The principle upon which this last mentioned process is based may be described as the reversal of the reaction.

(1) $Na_2CO_3$ plus $H_2S$ equals $NaHCO_3$ plus NaHS

through the removal of hydrogen sulphide from the solution by means of an inert gas, for instance, air.

But we have found that reaction (1) may be reversed by removing hydrogen sulphide from the solution through the agency of an oxidizing agent which reacts with it according to the reaction (2):—

(2) $2H_2S$ plus $O_2$ equals $2H_2O$ plus $2S$

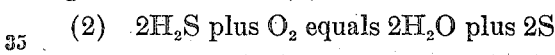

However, to obtain this result, it is absolutely essential to use an agent or catalyst which will cause the reaction to take place with sufficient rapidity to be commercial. Experiment has shown that the sulphide of cobalt has a catalytic effect, but is surpassed by the effect of sulphide of nickel, which we therefore prefer but to which we do not limit our generic claims. Other catalysts effective for the purpose are within the generically new invention of effecting by catalytic action the direct oxidation of soluble sulphides, in sulphided solutions, with immediate formation of sulphur.

The drawing illustrates diagrammatically an apparatus capable of carrying out the process, the apparatus being shown partly in perspective and partly broken away.

The numeral 1 indicates a gas inlet, 2 a tower containing checkerwork 3, over which the solution to absorb the hydrogen sulphide flows from the spray 4, the purified gas passing out the discharge pipe 5.

The solution from the tower passes out through the pipe 6 into the bottom of the tank 7 whereby the pipe is kept liquid sealed to prevent the gas from escaping. The solution contains the above mentioned insoluble nickel sulphide, which may be introduced into the circulating system either directly or by the usual well-known transformation that nickel sulphate undergoes when it meets the soluble sulphides in such a solution. The nickel sulphide is present as a catalyst and therefore in the slight amount that characterizes a catalyst, and so neither it nor any nickel compound from which it may be derived is introduced in an amount that could be effective stoichiometrically, instead of catalytically in the purification or regeneration process. For instance, a hundredth of one per cent of nickel is effective catalytically in the solution. The solution overflows from the tank 7 via the pipe 8 to the launder 9, which launder spreads the solution over the stepped sluice way 10, said sluice having a launder 11 to deliver the regenerated solution to the tank 12.

The pump 13 is operated at any time to deliver the solution from the tank 12 via pipes 14 and 15 to an upper tank 16 which has a pipe 17 leading to the spray 4, a valve 18 regulating the flow at the spray, the object being to run the pump 13 only when the tank 12 has filled whereby the plant requires very little attention.

Now it will be seen that as the sulphide charged solution passes over the sluice 10 the exposure to the oxygen of the air is sufficient to cause the deposition of the free sulphur and it can be collected from time to time as it may collect on said sluiceway.

Various factors are of great importance in determining the rapidity with which the desired reaction will go on in the presence of a fixed amount of the catalyst. One of the principal factors is the proportion of sodium bicarbonate to sodium carbonate in the solution. It appears that the reaction goes on rapidly when there is in the solution about four times the amount of bicarbonate that there is of the carbonate. A larger proportion than this of the bicarbonate appears to do no harm, but if the proportion falls much below this the speed of the reaction becomes much less.

The same process may also be used to remove sulphides from solutions of alkalies other than sodium carbonate. Thus, if a solution of sodium phosphate is used to scrub the gas it may be regenerated in the same manner as described above, with the aid of a suitable catalyst such as nickel sulphate transformed to nickel sulphide by the reaction that of course occurs immediately that such sulphate meets the soluble sulphide in the solution.

It will also be seen that this process does not require large volumes of air or other inert gas to be blown through the solution to free it of the hydrogen sulphide, and that no hydrogen sulphide is discharged into the atmosphere. Instead, this objectionable compound is destroyed by merely exposing the solution to the air, with the immediate formation of free sulphur, and without either employing aeration to carry off hydrogen sulphide or any need for large volume blast aeration.

What we claim is as follows, but modifications in the process may be made within the purview of the appended claims:

1. A process for regenerating an alkaline solution containing soluble sulphides, consisting in effecting direct reaction between the soluble sulphides and oxygen, by means of an essentially catalytic employment of an insoluble sulphide.

2. A process for removal of hydrogen sulphide from gas, consisting in treating the gas with an alkaline solution containing an essentially divalent element of the eighth group of the periodic system, the amount of such metal being less than that required by its stoichiometric relation with the hydrogen sulphide removed, and then treating the sulphided liquid with an oxidizing agent to effect direct oxidation of the soluble sulphides in the presence of said divalent element as a catalyst.

3. A process as in claim 2, in which the liquid contains the sulphide of an essentially divalent metal of the eighth group of the periodic system.

4. A process for the removal of hydrogen sulphide from gas, consisting in treating the gas with an alkaline solution containing nickel sulphide, then treating the fouled liquid with an oxidizing agent, whereby the nickel sulphide catalyzes the oxidation of the dissolved hydrogen sulphide with separation of free sulphur, and then returning the regenerated liquid to the gas treating stage, the nickel sulphide appearing substantially unchanged throughout the process.

5. A gas purification process consisting in, scrubbing the gas with a solution that removes the hydrogen sulphide and then regenerating the fouled solution by aeration that is essentially rendered effective by the catalytic employment of a catalyst; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

6. A method of removing $H_2S$ from gas which comprises passing the gas over surfaces wet with a solution which absorbs the $H_2S$ and then exposing the solution to the air, under substantially only the catalyzing influence of a catalytic agent whereby the air directly oxidizes the soluble sulphides and effectively liberates free sulphur therefrom; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

7. A method of removing $H_2S$ from gas which consists in passing the gas over surfaces wet with a solution which will absorb the $H_2S$ then adding a catalyst to the solution in such small amount as to have substantially only a catalyzing effect and then passing the solution over extended surfaces exposed to the air whereby direct oxidation of the soluble sulphides is effected and free sulphur is effectively liberated; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

8. A method of removing $H_2S$ from gas which consists in passing the gas over surfaces wet with a solution which will absorb the $H_2S$, adding a catalyzing material to the solution in such small amount as to have substantially only a catalyzing effect and then passing it over extended surfaces exposed to the air whereby direct oxidation of the soluble sulphides is effected and free sulphur is effectively liberated; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

9. A method of removing H₂S from the gas which consists in passing the gas over surfaces wet with a solution containing sodium carbonate and a catalyzing agent in such small amount as to have substantially only a catalyzing effect, then passing the sulphided solution, containing said catalyzing agent, over extended surfaces exposed to the air whereby direct oxidation of the soluble sulphides is effected and free sulphur is effectively liberated; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

10. A method of removing H₂S from gas which consists in passing the gas over surfaces wet with a solution which will absorb the H₂S, said solution containing nickel compound in such small amount as to have effect substantially only as a catalyst, and then passing the solution, containing said catalyst, over extended surfaces exposed to the air whereby direct oxidation of the soluble sulphides is effected and free sulphur is effectively liberated.

11. A process of regenerating alkaline solutions containing soluble sulphides by bringing about a direct reaction between the soluble sulphide and oxygen in the presence of a suitable catalyst in such small amount as to have substantially only a catalyzing effect; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

12. A process for regenerating alkaline solutions containing soluble sulphides by bringing about a direct reaction between the soluble sulphide and oxygen in the presence of a suitable catalyst in such small amount as to have substantially only a catalyzing effect; to produce free sulphur directly; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

13. A process for regenerating a solution of sodium carbonate which contains soluble sulphides by bringing about a direct reaction between the soluble sulphide and oxygen in the presence of a catalyst in such small amount as to have substantially only a catalyzing effect; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

14. A process for regenerating an alkaline solution containing hydrogen sulphide which consists in bringing about a direct reaction between the soluble sulphides and oxygen, with the direct production of free sulphur, by catalysis; the catalyst being a substance that normally forms an insoluble sulphide and that is freely reactive with such combined sulphur to form a readily oxidizable compound, and being present in a total amount that is minute in proportion to the combining weight of said substance with the soluble sulphides in such solution.

15. A process for regenerating an alkaline solution containing hydrogen sulphide which consists in bringing about a direct reaction between the soluble sulphides and oxygen with the aid of essentially catalytic employment of a nickel compound.

16. A process for purifying a solution containing hydrogen sulphide, consisting in effecting direct reaction between the soluble sulphides and oxygen, by means of an essentially catalytic employment of an insoluble sulphide.

17. A process for purifying a solution containing hydrogen sulphide which consists in bringing about a direct reaction between the soluble sulphides and oxygen with the aid of essentially catalytic employment of a nickel compound.

In testimony whereof we have hereunto set our hands this 6th day of October, A. D. 1924.

LUDWIG ROSENSTEIN.
RALPH A. MORGEN.
WILLIS S. YARD.